United States Patent
Landau et al.

(10) Patent No.: US 12,255,814 B2
(45) Date of Patent: Mar. 18, 2025

(54) MOBILE OVERLAY VIRTUAL ENTERPRISE NETWORK AND VIRTUAL INTERNET FOR ENTERPRISES

(71) Applicant: Netfoundry, Inc., Charlotte, NC (US)

(72) Inventors: John Landau, Charlotte, NC (US); Galeal Zino, Salisbury, NC (US)

(73) Assignee: NETFOUNDRY INC., Charlotte, NC (US)

( * ) Notice: Subject to any disclaimer, the term of this patent is extended or adjusted under 35 U.S.C. 154(b) by 827 days.

(21) Appl. No.: 17/335,007

(22) Filed: May 31, 2021

(65) Prior Publication Data
US 2021/0288907 A1    Sep. 16, 2021

Related U.S. Application Data (63) Continuation of application No. 16/300,524, filed as application No. PCT/US2017/034704 on May 26, 2017, now Pat. No. 11,025,540.
(Continued)

(51) Int. Cl.
*H04L 45/64* (2022.01)
*G06F 15/173* (2006.01)
(Continued)

(52) U.S. Cl.
CPC ............ *H04L 45/64* (2013.01); *G06F 15/173* (2013.01); *H04L 45/02* (2013.01); *H04L 45/08* (2013.01);
(Continued)

(58) Field of Classification Search
CPC ......... H04L 45/64; H04L 45/02; H04L 45/08; H04L 45/20; H04L 45/56; H04L 45/74;
(Continued)

(56) References Cited

U.S. PATENT DOCUMENTS

| 8,787,154 B1 | 7/2014 | Medved et al. |
| 8,954,491 B1 | 2/2015 | Medved et al. |
| (Continued) | | |

FOREIGN PATENT DOCUMENTS

| WO | 2015023537 | 2/2015 |

OTHER PUBLICATIONS

International Search Report and Written Opinon for PCT/US2017/034704 dated Oct. 12, 2017 Oct. 12, 2017.

*Primary Examiner* — Will W Lin
(74) *Attorney, Agent, or Firm* — BRYAN CAVE LEIGHTON PAISNER LLP (57) ABSTRACT

A number of embodiments can comprise a system. The system can comprise an application and one or more software nodes under control of the application, wherein the application is configured to perform: instructing a software node of the one or more software nodes to route data to a target node of the one or more software nodes; analyzing, using a routing engine, associated paths through the one or more software nodes to the target node, wherein the associated paths comprise at least one path traversing both a mobile enterprise network and a virtual enterprise network; selecting one or more candidate next hop nodes of the one or more software nodes based on the analyzing the associated paths; causing the data to be routed to at least one of the one or more candidate next hop nodes, as selected; and repeating the analyzing, the selecting, and the causing until the data reaches a destination. Other embodiments are disclosed here.

20 Claims, 3 Drawing Sheets

Related U.S. Application Data (60) Provisional application No. 62/341,719, filed on May 26, 2016.

(51) Int. Cl.
*H04L 45/00* (2022.01)
*H04L 45/02* (2022.01)
*H04L 45/74* (2022.01)
*H04L 65/102* (2022.01)
*H04L 65/80* (2022.01)

(52) U.S. Cl.
CPC .............. *H04L 45/20* (2013.01); *H04L 45/56* (2013.01); *H04L 45/74* (2013.01); *H04L 65/102* (2013.01); *H04L 65/80* (2013.01)

(58) Field of Classification Search
CPC ..... H04L 65/102; H04L 65/80; H04L 45/302; G06F 15/173
See application file for complete search history.

(56) References Cited

U.S. PATENT DOCUMENTS

| | | | |
|---|---|---|---|
| 9,071,607 | B2 | 6/2015 | Twitchell, Jr. |
| 9,338,092 | B1 | 5/2016 | Allen |
| 9,948,603 | B1* | 4/2018 | Lee ................ H04L 61/106 |
| 11,025,540 | B2* | 6/2021 | Landau ............. H04L 45/64 |
| 2006/0265508 | A1* | 11/2006 | Angel .............. H04L 61/2567 709/230 |
| 2010/0058468 | A1* | 3/2010 | Green .................. G06F 21/51 726/22 |
| 2011/0209196 | A1* | 8/2011 | Kennedy ............ G06Q 30/02 726/1 |
| 2011/0228678 | A1 | 9/2011 | Ricciulli |
| 2013/0157644 | A1* | 6/2013 | Berg .................. H04W 40/02 455/418 |
| 2013/0166689 | A1* | 6/2013 | McCullough ...... G06F 12/123 711/158 |
| 2014/0153572 | A1 | 6/2014 | Hampel et al. |
| 2015/0188751 | A1 | 7/2015 | Vasseur et al. |
| 2015/0365314 | A1 | 12/2015 | Hiscock et al. |
| 2016/0094398 | A1 | 3/2016 | Choudhury et al. |
| 2016/0105471 | A1 | 4/2016 | Nunes et al. |
| 2019/0132280 | A1* | 5/2019 | Meuninck ........... H04L 69/321 |
| 2019/0386969 | A1 | 12/2019 | Verzun et al. |

* cited by examiner

MOBILE OVERLAY VIRTUAL ENTERPRISE NETWORK AND VIRTUAL INTERNET FOR ENTERPRISES

CROSS REFERENCE TO RELATED APPLICATION

This application is a continuation of U.S. application Ser. No. 16/300,524. Application Ser. No 16/300,524 is a national stage entry of PCT No. PCT/US17/34704. PCT No. PCT/US17/34704 claims the benefit of U.S. Provisional App. No. 62/341,719. PCT No. PCT/US17/34704, U.S. application Ser. No. 16/300,524, and U.S. Provisional App. No. 62/341,719 are incorporated herein by this reference in their entirety.

FIELD

The present invention relates to networking, and in particular, to network routing and network communications.

BACKGROUND

In today's Internet, an application (or service) sends packets to the wire, and lower layer switches and routers, which are responsible for determining the packet transport path to the destination. The application does not control or determine the path. Likewise, the network doesn't control the application, and therefore can't directly "instruct" the application's behavior. The application and the network do not directly "speak" to one another to optimize the overall behavior, and do not use common identities or policies. Rather, the job of the network is to connect network nodes to other network nodes; not to connect applications or services.

SUMMARY

A number of embodiments can comprise a system. The system can comprise an application and one or more software nodes under control of the application, wherein the application is configured to perform: instructing a software node of the one or more software nodes to route data to a target node of the one or more software nodes; analyzing, using a routing engine, associated paths through the one or more software nodes to the target node, wherein the associated paths comprise at least one path traversing both a mobile enterprise network and a virtual enterprise network; selecting one or more candidate next hop nodes of the one or more software nodes based on the analyzing the associated paths; causing the data to be routed to at least one of the one or more candidate next hop nodes, as selected; and repeating the analyzing, the selecting, and the causing until the data reaches a destination.

A number of embodiments can comprise a method. The method can comprise instructing a software node of the one or more software nodes to route data to a target node of the one or more software nodes; analyzing, using a routing engine, associated paths through the one or more software nodes to the target node, wherein the associated paths comprise at least one path traversing both a mobile enterprise network and a virtual enterprise network; selecting one or more candidate next hop nodes of the one or more software nodes based on the analyzing the associated paths; causing the data to be routed to at least one of the one or more candidate next hop nodes, as selected; and repeating the analyzing, the selecting, and the causing until the data reaches a destination.

An aspect of the present invention relates to a platform, network and network control plane, which have multi-tier, multi-tenant architectures that enable applications to communicate with network elements and to communicate with intermediate platforms in order to determine their own network paths over any combination of networks, and to cooperate with the network to determine the networking which meets the application's, application user's and application administrator needs. The applications can be any application, including but not limited to enterprise applications, SaaS, PaaS, IoT, cognitive, AI, virtual reality, augmented reality, gaming and entertainment. The applications are enabled to "build their own networks", feeding application goals, requirements and policies to a platform which then can create new networks, comprised of software-defined network nodes on commodity servers and compute, including end user devices such as mobile phones and IoT devices. These networks can be ephemeral, specific to a single application flow and torn down after the flow.

In another aspect, a system of software nodes forms an overlay network on a physical, lower level network of physical nodes, and permits an application to control or at least influence network routing over the physical network.

Another aspect of the present invention relates to a platform with a multi-tier, multi-tenant architecture that enables application owners, where owner is defined as ASPs, users and/or organizations, to dictate end-to-end policies and goals, independent of underlying access network owners and technology. Policies can change parameters to achieve policy goals, including transport path traversed; networks traversed; encryption and security parameters; logical or physical geographies traversed; network protocols used; number of connections per session; number of different routes per session; number of times to transmit each packet; error handling and threat responses; network interfaces used; redundancy and backup options; TCP and UDP acceleration and optimization options; proxy, gateway, firewall, security element and B2BUA insertion; thresholds and responses to packet loss, jitter and latency; and algorithms used to determine network paths including machine learning and predictive algorithms Another aspect of the present invention relates to a platform with a multi-tier, multi-tenant architecture that enables application owners to dictate policies for end-to-end desired business results, independent of underlying access networks. Business results can includes quality, measured qualitatively or quantitatively; reliability, connection success ratios, availability and uptime; compliance; security; and throughput and speed.

Another aspect of the present invention relates to a platform with a multi-tier, multi-tenant architecture that has APIs, SDKs and Portals, which enable application owners to set the policies listed above.

Another aspect of the present invention relates to a platform with a multi-tier, multi-tenant architecture that includes APIs, SDKs and Portals (web and mobile app), that also enable the policies to be set or changed according to real-time or anticipated (via machine learning or algorithms) conditions, triggers or events. The events can be machine-generated, for example from an IoT sensor or camera, or an AI application observing anomalies or patterns in an IoT feed, or based on human interaction with the application; or based on external events (weather, political, etc) or predicted external events.

Another aspect of the present invention relates to a platform with a multi-tier, multi-tenant architecture that includes APIs and Portals, and instrumentation to provide application owners with end-to-end data, analytics and visibility of their application, regardless of networks traversed, for example APIs, SDKs and real-time data feeds which provide network performance, security and compliance data to the application and/or application user, in real-time, proactively (e.g. predicted by machine learning) and historically Another aspect of the present invention relates to platform with a multi-tier, multi-tenant architecture APIs and Portals, which enable the network to communicate to the app in real-time, such that the application may change its current or future behavior in order to meet application owner policies or proactively account for conditions anticipated by machine learning or other algorithms and policies. For example, bi-directional APIs and SDKs which enable the network and app to continually communicate/collaborate to optimize security, quality or make changes due to events, at time according to identities (user identities, application identities, thing (IoT) identities, silicon/chip/hardware identities) which may be communicated from the application or from systems/platforms involved in the application's management.

Another aspect of the present invention relates to platform APIs and Portals, that enable application owners to share identities, authentication, authorization and policies with other systems, both accepting policies from other systems and distributing policies to other systems, such that network elements and application layers can leverage common identities, security and policies Another aspect of the present invention relates to a method of routing packets through a physical network. The method comprises providing one or more software nodes, the software nodes being connected to each other over the physical network to form an overlay network; and forming a communications channel between at least one of the software nodes and an application, wherein the application instructs the at least one software node on how to route data over the physical network, or how to query another element to discover routing instructions. The application may use different instructions for different types of data to be transmitted over the physical network.

In some embodiments of the method, the application and the at least one software node dynamically adjusts routing during communications In some embodiments of the method, at least one software node is associated with a target node of the physical network, and upon receipt of data from the target node, the at least one software node instructs the target node to transmit to a new target node of the physical network. The node may be a pool of software defined nodes, abstracted via techniques such as load balancing, DNS, GeoDNS and multi-casting.

In some embodiments of the method, communications are transmitted from the overlay network to the application in real time during execution of the application to cause the physical network to change its operation including creating new network nodes to be created in quasi-real-time and added to the network in order to meet certain application needs In some embodiments of the method, the application is selected from the group comprising an enterprise application, a software as a service (SaaS), a platform as a service (PaaS), an internet of things (IoT), a cognitive computing application, an artificial intelligence (AI) application, a virtual reality application, an augmented reality application, a gaming application and an entertainment application.

Another aspect of the present invention relates to an overlay network for use with a data network that routes packets from one location on the data network to another location on the data network. The overlay network comprises one or more software nodes, wherein at least one of the software nodes is configured to receive commands from an application. The application includes software for generating the commands and sending the commands to the at least one of the software nodes. The commands used by the at least one of the software nodes to control routing of packets, generated by the application, through the data network.

In some embodiments of the overly network, at least one of the software nodes is configured for bidirectional communication with the application.

In some embodiments of the overly network, at least one of the software nodes is configured to dynamically negotiate with the application to implement changes to the routing of the packets.

In some embodiments of the overly network, at least one of the software nodes is an edge endpoint.

In some embodiments of the overly network, the software for generating commands is configured to change the commands based upon at least an Internet of Things (IoT) feed.

In some embodiments of the overly network, the software for generating commands is configured to change the commands based at least in part upon a sensor or a camera input.

In some embodiments of the overly network, the destination is a target node.

In some embodiments of the overly network, the at least one of the software nodes is configured to dynamically transmit to the application, based upon conditions at the target node, an address corresponding to a new target node.

In some embodiments of the overly network, the application is selected from the group comprising an enterprise application, a software as a service (SaaS), a platform as a service (PaaS), an internet of things (IoT), a cognitive computing application, an artificial intelligence (AI) application, a virtual reality application, an augmented reality application, a gaming application and an entertainment application.

Another aspect of the present invention is a software platform for network communications. The software platform comprises computer-executable instructions configured to generate an overlay network, which may be worldwide, and which enables an application to determine a network path through an underlying access network for data generated by the application.

In some embodiments of the software platform, computer-executable instructions are provided, which are configured to enable an owner or user of the application to set end-to-end policies, independent of the underlying access network.

In some embodiments of the software platform, computer-executable instructions are provided, which are configured to enable an owner or user of the application to set policies for end-to-end desired business results, independent of the underlying access network.

In some embodiments of the software platform, computer-executable instructions are provided, which are configured to generate an API that enables the owner or user of the application to set at least one of the end-to-end policies and the policies for end-to-end desired business results.

In some embodiments of the software platform, the policies can be set or changed according to at least one of real-time conditions, triggers and events.

In some embodiments of the software platform, computer-executable instructions are provided, which are configured to generate an API and instrumentation which provides an application with end-to-end data, analytics and visibility of the application, regardless of networks traversed in the underlying access network.

In some embodiments of the software platform, computer-executable instructions are provided, which are configured to generate one or more APIs and one or more portals that enable the global overlay network to communicate with the application in real-time, such that the application may change its behavior in order to meet application owner policies.

In some embodiments of the software platform, the one or more APIs enables the owner of the application to share policies with one or more other systems.

In some embodiments of the software platform, the one or more APIs enables the owner of the application to accept policies from the one or more other systems and distribute policies to the one or more other systems.

In some embodiments of the software platform, the global overlay network is integrated with the platform and comprises a plurality of software nodes.

In some embodiments of the software platform, the nodes are connected as traditional networked nodes, as peer-to-peer mesh nodes, or any combination thereof.

In some embodiments of the software platform, the nodes are agnostic to at least one of network technology and network ownership of the underlying access network.

In some embodiments of the software platform, the nodes are located in a public cloud, a private cloud, an Internet backbone environment, or on end user devices.

In some embodiments of the software platform, the nodes are applications, VNFs, standalone devices running on commodity computers, purpose built appliances, or services embedded in network infrastructure.

In some embodiments of the software platform, the services embedded in the network infrastructure comprise gateways, firewalls, proxies, deep packet inspection and session border controllers.

Another aspect of the present invention is a method for routing data generated by an application to a destination under the control of the application. The method comprises: a) instructing, with the application, a software node of a global overlay network to initially route the data to a policy-defined target node of an underlying access network; b) at the target node, analyzing needs of the application and a real time status of candidate next hop nodes and associated paths of the underlying network with another software node of the global overlay network or a routing engine; c) selecting, with the another software node or routing engine, one of the candidate next hop nodes of the underlying network, which best meets the needs of the application; d) causing the data to be routed to the selected one of the candidate next hop nodes of the underlying network; and repeating steps b)-d) until the data reaches the destination.

In some embodiments of the method for routing data, the needs of the application include end-to-end policies of the application.

In some embodiments of the method for routing data, the needs of the application include policies for end-to-end desired business results of the application.

In some embodiments of the method for routing data, the policies can be set or changed according to at least one of real-time conditions, triggers and events.

In some embodiments of the method for routing data, the software nodes are connected as traditional networked nodes, as peer-to-peer mesh nodes, or any combination thereof.

In some embodiments of the method for routing data, the software nodes are agnostic to at least one of network technology and network ownership of the underlying access network including Internet, mesh networks and peer-to-peer networks In some embodiments of the method for routing data, the software nodes are located in a public cloud, a private cloud, an Internet backbone environment, on IoT devices, or on end user devices.

In some embodiments of the method for routing data, the software nodes are applications, VNFs, standalone devices running on commodity computers, purpose built appliances, or services embedded in network infrastructure.

In some embodiments of the method for routing data, the services embedded in the network infrastructure comprise gateways and session border controllers.

DETAILED DESCRIPTION

Disclosed herein is a platform, network and network control plane that enable applications to determine, or at least influence, their own network paths. The application tells the switches and routers how and where to route its packets. The "where" may comprise a global overlay network, which includes endpoints, IP Back to Back User Agents (BBUAs), and management and control instance, that is managed according to the present invention. The global overlay network may be built on an existing endpoint and BBUA software. In one non-limiting embodiment, the global overlay network may be built on the endpoint and IP BBUA software disclosed in U.S. Pat. No. 9,071,607, the entire disclosure of which is incorporated herein by reference. Further, the network of the present invention can continually "negotiate" with the application to dynamically make changes. The present invention can allow application users (people and/or devices), the user's administrative domain (usually a business or organization) and provider (often an ASP), to enact policies and business logic, which control networks that they don't own or manage. The network and network control is essentially embedded inside the application, regardless of where the application is physically launched from. Therefore, applications and application managers can control any network from anywhere, according to their needs and goals, without owning or managing the network.

Figure 1:
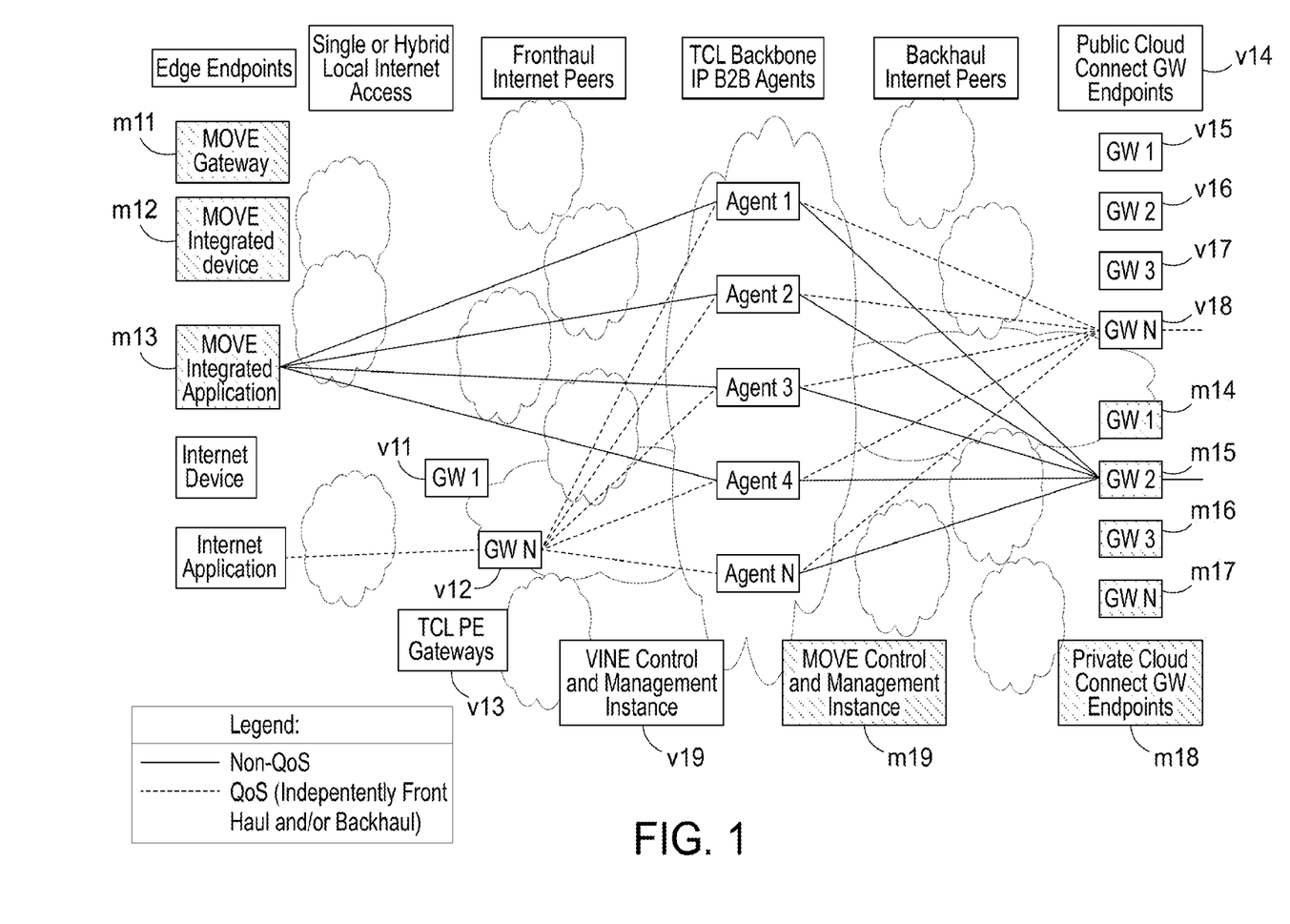
FIG. 1 is block diagram illustrating an exemplary embodiment of a mobile overlay virtual network (MOVE) and an exemplary embodiment of a virtual internet for enterprises (VINE).
Figure 2:
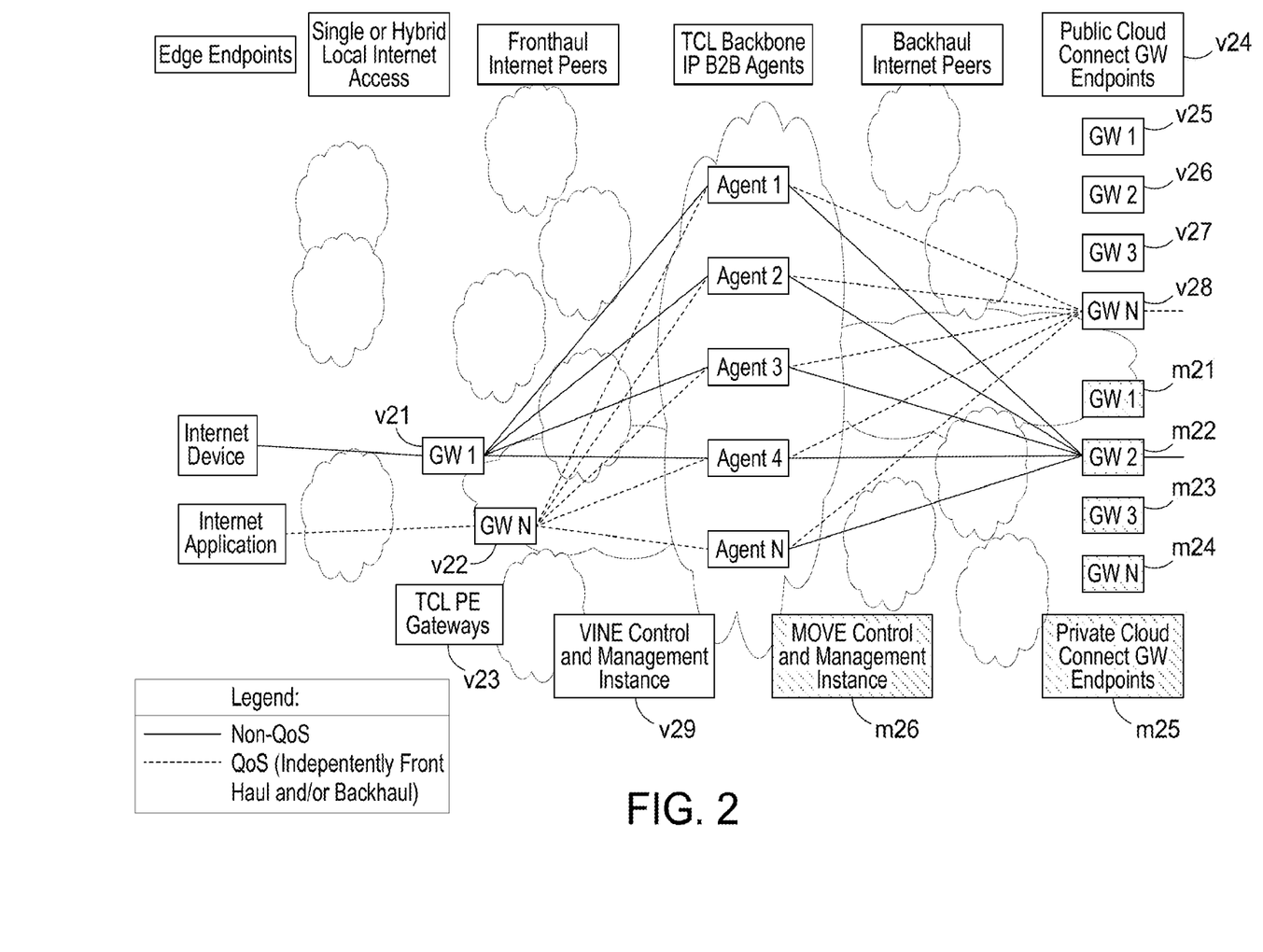
FIG. 2 is block diagram illustrating another exemplary embodiment of the VINE and another exemplary embodiment of the MOVE.

FIGS. 1 and 2 illustrate exemplary embodiments of global overlay networks according to the present invention. One of the global overlay networks may comprise a mobile overlay virtual enterprise (MOVE) network and another global overlay network may comprise a virtual internet for enterprise (VINE). The MOVE network and the VINE are platforms built on any set of networks for enterprise security, policy control, compliance, performance and reliability network capabilities into applications and devices ubiquitously across any and all broadband access, campus LAN and WAN, as illustrated in FIGS. 1 and 2. The MOVE network travels with the applications and devices. The MOVE network has MOVE endpoints M11-M18, and a MOVE backbone M19 in FIG. 1 and MOVE endpoints M21-M25 and a MOVE backbone M26 in FIG. 2, which are software-embedded. The VINE provides enhanced internet performance and security to any application or browser over any internet access, with no software modifications. The MOVE network and the VINE share the same high capability internet-overlay platform that provides:

1) Better Quality of Experience (QoE) via dynamically optimized utilization of multiple parallel Internet Routes and TCP optimization.
2) Extremely robust security and network resilience as a Software Defined Perimeter (SDP) per the Cloud Security Alliance (CSA), creating highly secure and trusted end-to-end networks between any IP addressable entities that are highly resilient to network attacks.
3) On-demand, dynamically provisioned, "airgapped" networks. Enterprise-level management and control.

The MOVE network and the VINE can be used for B2E (business-to-employee), B2B (business-to-business), and B2C (business-to-consumer) cloud-distributed communications amongst users, machines, and servers, to provide higher network performance, extreme levels of data-in-motion security, and enterprise-level control.

In some embodiments, the MOVE network and the VINE can comprise an "embeddable enterprise network service" that enables a site-less enterprise-managed overlay VPN to be integrated within applications that require a "site-less" capability for enterprise network security and performance, unconstrained by the inflexibility of a site-level WAN or SD WAN that is bound to one or more physical networks. Such applications include without limitation:

Enterprise-developed applications.
3rd parry ISVs.
SaaS (e.g., CRM, sales force automation, office suites, HR, Finance, ERP, document management, CAD, ITaaS, etc.).
B2C services (e.g., eCommerce, Finance, Healthcare, and etc self service, service desks, Points of Sale, Kiosks).
IaaS, PaaS and APaaS (e.g., AWS, Azure, Google, SalesForce, Softlayer, BlueMix, MBaaS platforms, etc.).
IoT implementations (e.g., GE, Telit, PTC, Gemalto, numerous other platforms).
Cloud storage (e.g., Box, Dropbox, Egnyte, etc.).
cloud security (e.g., Zscaler, Bluecoat, Websense, Cisco Scansafe, etc.).
UCaaS.
API Service Provider platforms (e.g., Twilio, Kandy, Nexmo, Cisco Tropo, etc.).
Entertainment sites.
Collaboration platforms (e.g., Webex, Go to Meeting, SFB, etc.).
Office application suites (e.g., Microsoft, IBM, Google).

The MOVE network and the VINE, thus, add major new GTM channels for enterprise VPNs. For one example from just above, an ASP such as Microsoft Office365 for B2E or GE Predix for IoT, can integrate strong QoE, hyper-secure MOVE network into their application platform, where:

The ASP can manage their multi-tenanted MOVE/VINE network as an integral part of their platform service
The ASP can provide each enterprise tenant with autonomous control of their own ASP-bound VPN
The tenant-level exposure may be fully integrated inside their overall platform management, it may be native white-labeled MOVE/VINE management, or it may be a hybrid.

In some embodiments, the MOVE network and the VINE may be operative as a "un-network," because they make the VPN part of an application or service instead of being a separate network that the application or service has to traverse. 59 The MOVE network and the VINE can operate transparently across a mix of LAN and WAN, private and public, physical and virtual, fixed and mobile networks and network functions that they traverse, as illustrated in FIGS. 1 and 2. The MOVE network and the VINE supplement and relieve the constraints of traditional fixed and Mobile Internet and enterprise WANs and SD WANs.

In some embodiments, the MOVE network can comprise an enterprise VPN, which provides the enterprise with autonomous performance and compliance monitoring and control for sessions amongst any of the MOVE endpoints M11-M18 (FIG. 1) and M21-25 (FIG. 2), which are any mix of:

Applications using the MOVE SDK.
IoT Devices using the MOVE SDK or device driver.
Stand-alone MOVE gateways (e.g., M14-M17 in FIG. and M21-M24 in FIG. 2).
Public cloud instances of MOVE (MOVE gateway "cloud connect").
Private cloud instances of the MOVE network (e.g., M18 in FIG. 1 and M25 in FIG. 2).
Multi-function gateways where a partner has integrated the MOVE network with their own network functions (e.g., Loadbalancers/ADCs, SIP gateways, MCUs, recorders, etc.).
Internet "breakout" endpoints via the VINE, such as V11, V12, V21 and V22 as shown.

61 In some embodiments, the MOVE network can be implemented within a multitenant platform such as Office365 or GE Predix, but where the ASP has the ability to provide autonomous enterprise network management to each of their client enterprises, and where each enterprise can be enabled to operate to their own authentication, performance and compliance policy for Office365 or GE Predix communications.

In some embodiments, as illustrated in FIGS. 1 and 2, the VINE may comprise a premium overlay shown, for example, as V11-12+V15-18, V21-22 and V25-28.

The CE-to-PE connection may be over local underlay public internet access, encrypted such as with TLS or IP Sec or unencrypted. The VINE may require no software changes to the client application M13 or device M12 (FIG. 1). Similar to a CDN, the VINE can be integrated, via DNS Cname addressing. V19 (FIG. 1) and V29 (FIG. 2) may be controllers in the network, which provide full duplex internet session acceleration, hyper-security, and instrumentation, providing:

Premium public internet for performant and highly secure web transactions.
Optional QoS prioritized physical network routing:
On the "backhaul" from the IP BBUAs to public and private cloud endpoints.

On the "fronthaul" from the edge endpoints to the IP BBUAs.

"Internet breakout" to/from MOVE enterprise VPNs.

Private application servers "cloud connect" via cloud-based MOVE Gateways providing managed, secure performance and compliance into all major public clouds and optionally private clouds.

63 Application and Device VPNs using TSL or IPsec tunnels over best effort internet are well-established today. The MOVE and the VINE provide a stronger value proposition for commercially-sensitive sessions where Quality of Experience is proportional to revenue and compliance must be rigorously managed. The MOVE network and the VINE provide:

Better Quality of Experience:

| TLS or IP Sec over Internet | MOVE and VINE over Internet |
|---|---|
| Best Effort Backbone Single static backbone route subject to selected path's capacity and route latency. | Dynamically Optimizing Backbone Aggregating capacities over multiple parallel backbone paths. Deselecting poor performing paths and rolling to better performers Optional QoS prioritized physical network routing On the "backhaul" from the IP BBUAs to public and private cloud endpoints On the "fronthaul-from the edge endpoints to the IP BBUAs |

Multi-Factor Hyper-Security:

| Security Function | TLS or IPsec over Internet | MOVE over Internet | VINE over Internet |
|---|---|---|---|
| Software Defined Perimeter (SDP) | Not Applicable | SDP as defined by Cloud Security Alliance | SDP other than the edge endpoint to PE PoP |
| Data-in motion security | Single encrypted tunnel, single route Tunnel compromise = data compromise (eg "Heartbleed" SSL flaw) Endpoint routings visible Metadata exposed | Flow fragments spread across dynamically rolling multiple routes, each fragment encrypted in two separate "air-gapped" tunnels. Tunnel-compromise extremely difficult and only partial Endpoint routings masked | Single TLS tunnel for client endpoint to PE PoP. PE to PE and PE to Cloud is identical to MOVE |
| DDOS protection | None | High immunity. Rolls from congested routes, accepts traffic from authenticate d endpoints | High immunity |
| Man in Middle Protection | None? | High Immunity | High Immunity |
| OWASP Top 10 Protection | Partial | High Immunity assuming trusted endpoints | High Immunity assuming trusted Endpoints |
| ARP poisoning protection | None | High immunity Rejects corrupted packets | High Immunity |
| Data sovereignty management | None | Flow fragments can be routed via selected sovereignty domains | PE to PE and PE to Cloud is identical to MOVE |

Enterprise Monitoring and Control:

| TLS or IP Sec over Internet | MOVE and VINE over Internet |
|---|---|
| Encrypted session Basic public internet reporting and analytics | Secured session Data sovereignty routing Direct SDK or 5-Tuple policy control for QoE and Compliance Whitelist Flows Blacklist Flows Greylist Flows SDWAN-like reporting and analytics Hierarchical management rights ASP or MSP level management across enterprises nterprise-level management |

Various embodiments of the MOVE network, as illustrated in FIG. 1, can have one or more of the following uses, structures, and capabilities:

Typical use cases: B2E, B2B, B2C, and IoT enterprise networking.

Form Factors/Overlay Network Presentation:

MOVE SDKs for integration of Enterprise Network into any application (Android, IoS, others):

Direct application SDK.

Embeddable SDK for integration into network-enabled SDK functions (eg UCaaS SDKs).

MOVE device drivers for integration of Enterprise Network into any LINUX and Windows machines.

MOVE Gateway for aggregation of local traffic sources onto the Enterprise Network.

One common Virtual Backbone for both MOVE and VINE.

Enterprise Overlay Network Application Policy Management:

Prioritize and selectively route or block sessions to the overlay network:

5 Tuple resolution: source IP address/port number, destination IP address/port number and the protocol in use, Enterprise Overlay Network Monitoring and Analytics.

Heirarchical multi-tenant management, monitoring and analytics to pass network management down the delivery chain:

E.g., SaaS provider view=>MSP partner view=>Enterprise Customer view=>Enterprise Department view=>End User view.

Transparent interoperability with all mobile broadband access, campus LAN, Data Center LAN, and WAN virtual and physical network functions:

Enterprise Switches, routers, firewalls, DPIs, IP VPNs, SD WAN, etc.

Carrier network MPLS, Ethernet, 3G, 4G and Internet.

Cloud networks.

Highest levels of data-in-motion security:

Cloud Security Alliance Software Defined Perimeter:

Rigorous isolation from unsecured network and high resilience to attacks.

"Dynamic Spread Transport" of each session as many "fragment-flows" across numerous internet paths prevents man-in-the-middle monitoring.

Separately secure encryption of each of two "airgapped" legs comprising each dynamically shifting fragment flow in a session.

Detection and discard of corrupted packets.

Providing High immunity to DDOS, Man in the Middle, and OWASP Top 10 attacks.

Maximum available network bandwidth and performance:

"Dynamic Spread Transport" load-balances and multiplexes multiple best available paths across the public internet backbone:

Available bandwidth=sum of all the paths.

Adaptive congestion and high latency avoidance.

Dynamic Spread Transport load-balances and multiplexes across multiple WAN access networks as available to any WLAN/LAN campus or Public or Private Data Center:

Available bandwidth=sum of all the access networks.

Transport Protocol Optimization:

TCP/IP proxy to eliminate TCP/1P sensitivity to WAN latency.

MOVE and VINE Interop:

MOVE policy management, monitoring and analytics encompass multipoint sessions that include a mix of VINE PoP public internet endpoints and MOVE enterprise network endpoints.

Optional QoS Backhaul and QoS Fronthaul with preferred routing via COS-prioritized TCL Tzo WAN:

Via Policy selection of preferred routing via QoS IP Back-2-Back Agents:

Front Haul to Front Haul QoS for Peer to Peer with QoS.

Front Haul to Back Haul QoS for Endpoint to MOVE Cloud.

Backhaul QoS alone for QoS "cloud connect" paths:

Best effort is only to the closest VINE PoP.

Or any mix for multipoint connections.

With transparent automated rollover to other available Internet Access if QoS IP Back2Back Agents are impaired.

Various embodiments of the VINE, as illustrated in FIG. 2, can have one or more of the following uses, structures, and capabilities:

Typical Use Cases: B2C, B2B, B2E public internet connections.

Form Factors:

Softwareless HTTP or HTTPS/TLS session access via URL.

CDN-style DNS address resolution (CName) to a local VINE PoP.

One common Virtual Backbone for both the MOVE and the VINE.

Transparent internet transport with local PoP accesses across a High security, High Performance inter-PoP Virtual backbone sharing the capabilities of MOVE, above:

A VINE PoP is a shared industrial scale MOVE gateway.

VINE PoP-to-VINE POP for non-MOVE endpoints (including non-MOVE Clouds).

VINE PoP-to-MOVE Cloud using a Move Gateway Cloud Connect.

Self-service monitoring, analytics and management of the end to end internet flows.

MOVE and VINE Interop:

MOVE policy management, monitoring and analytics encompass multipoint sessions that include a mix VINE PoP public internet endpoints and MOVE enterprise network endpoints.

66 In various embodiments, the MOVE/VINE Cloud Connect M18, M25/V14, V24 and Cloud Exchange can have the following use, structure, and capabilities:

Use Case: Integrates MOVE/VINE network security, performance, and resilience directly into private and public clouds Cloud Connect=singular cloud connection using a private or dedicated cloud gateway instance Cloud Exchange=on-demand connection to any of many pre-connected clouds via a multi-tenant cloud gateway instance Reduces dependency on less flexible, more costly physical MPLS VPN-based cloud connect Form Factor:

VNF (virtual network function) MOVE Gateways for Public and Private Cloud connections to MOVE enterprise WANs and VINE public internet.

Optional QoS on the backhaul leg from the IP Back to Back Agents to the cloud and also on the Fronthaul from edge endpoints to the Agents.

Cloud Connect: Private gateways for private or dedicated instances in public and private cloud Cloud Exchange: Pre-configured autoscaling multitenant gateways in AWS, Azure/O365, Force.com/SalesForce and other public clouds 67 The MOVE network can be implemented as an endpoint software, which establishes spread-transport flows across a global public internet "spread-transport" backbone, and dynamically spreads each session across multiple public internet pathways similar to how spread-spectrum radios dynamically spread radio links across multiple radio frequencies. The MOVE endpoints M11-M18 (FIG. 1) and M21-M25 (FIG. 2) collaborate to break up/reassemble each flow into multiple fragment-flows that are dynamically load-balanced across highly dispersed public internet pathways:

Each of many spread-transport fragment-flow pathways is through a core PoP "IP back-to-back agent" (similar to a SIP Back to Back User Agent):

The Cloud Security Alliance Software Defined Periphery (SDP) encompasses a similar "air gapped" transport, but has typically be implemented without spread-transport back2back agents.

Each spread-transport fragment-flow pathway is comprised of two independently encrypted separately initiated back to back IP paths, masking the actual endpoint pair members from each other.

Spread-transport is extremely secure:

Each session is broken into multiple fragment-flows, dynamically routed across independent internet routes:

Even data-in-motion metadata is un-monitorable.

Each fragment-flow half-path is individually securely encrypted.

Corrupted packets are identified and quarantined

Providing ARP poisoning immunity.

Interception of an entire multi-fragment flow is not possible at any point in the network other than an endpoint, including by Tata Communications. This protects from even meta-data or flow-behavior monitoring:

Even interception of one encrypted fragment is highly improbable because the fragment flows dynamically hop across different internet pathways.

The IP Back-to-Back agent moves IP address surfaces into the cloud onto a non-impacting attack target.

Performance is provided via dynamic load-balancing to utilize the available capacity across the cumulative pathways that the session fragment-flows are spread across:

The virtual internet path is not limited by the capacity and other impairments of any one internet path.

Performance may be further enhanced via QoS-prioritized physical network routing of fragments on either or both of The backhaul path between cloud endpoints and the IP back to back agents The fronthaul path between edge endpoints and the IP back to back agents Reliability is provided by the same dynamic load balancing:

Underperforming internet pathways will be automatically identified and taken out of route:

Providing inherent immunity to volumetric DDOS attacks.

The following Table, summarizes the uses of the present invention:

| WAN Manager | Edge | Cloud | Comments |
|---|---|---|---|
| Enterprise as "prime" | | | |
| B2E | MOVE SDK enterprise-developed apps<br>MOVE wrappers for off-the-shelf apps, eg SFB<br>MOVE drivers for PCs and user appliances<br>VINE via Browser TL<br>MOVE Gateway for Site aggregation | MOVE Gateway fronting enterprise private and public cloud apps<br>Connect dedicated instances<br>Cloud Exchange multi-tenant instances | Sessions include<br>Edge to Cloud<br>Edge to Edge (eg VoIP)<br>Multiple Edges(eg collaboration)<br>Multiple Edges and Cloud<br>For Wrappers-<br>OEM from someone like OpenPeak<br>Partner with MDM/MAM players |
| B2C | VINE via Browser T<br>MOVE SDK enterprise-developed apps | MOVE Gateway fronting enterprise private and public cloud apps<br>Cloud Connect<br>Cloud Exchange | Sessions include<br>Edge to Cloud<br>Edge to Edge (eg VoIP)<br>Multiple Edges (eg collaboration)<br>Multiple Edges and Cloud |
| B2B Federation | MOVE to SD WAN,<br>MOVE to WAN or<br>MOVE to MOVE back to back Gateway | NA | Federated entities independently manage the federated SD WANs, with agreed policy control of ingress/egress via the GW |
| IoT | MOVE devices<br>MOVE IOT aggregators with local processing<br>IoT LAN to MOVE Gateway | MOVE Gateway fronting enterprise private and public cloud apps | |
| Enterprise as a SaaS network "tenant" | MOVE-integrated SaaS client<br>Browser TLS to VINE | MOVE Gateway fronting SaaS provider | Enterprise Tenant Instance will ideally be managed fully integrated within the SaaS management<br>Provisioning, authentication, policy, etc<br>Additional reporting may be required |
| SaaS/PaaS provider | | | |
| User Apps | MOVE-integrated SaaS client<br>Browser TLS to VINE | MOVE Gateway fronting SaaS provider | SaaS provider multi-tenant MOVE management<br>Enterprise Tenant Instance will ideally be managed fully integrated within the SaaS management |

-continued

| WAN Manager | Edge | Cloud | Comments |
|---|---|---|---|
| IoT | MOVE-integrated Device MOVE-integrated IOT aggregator MOVE Gateway | MOVE Gateway fronting SaaS/PaaS provider | SaaS/PaaS provider multi-tenant MOVE management Enterprise Tenant Instance will ideally be managed fully integrated within the SaaS/PaaS management |
| TCL UC Service Infrastructure | Provider Edge MOVE Gateways fronting Network functions such as SBC and Load Balancers MOVE-Integrated Network Functions | NA | |
| TCL Network Service Infrastructure | VINE as an extension of IZO WAN MOVE/VINE integration with TCL CDN MOVE as an out-of-band management network | NA | |
| Network Function Providers | MOVE integration within Physical and Virtual Network Functions such as SBC, ADC/Load balancers, and SD | NA | MOVE management will ideally be integrated within the network function management Candidates: Sonus, Citrix Netscaler |
| WAN edge devices (?) | | | |
| API Platform Services Providers | MOVE SDK embedded with other SDK functions, eg WEB RTC | MOVE Gateway fronting enterprise private and public cloud apps MOVE Gateway fronting SaaS or PaaS platform | "Native" direct enterprise MOVE management or MOVE management integrate within the "parent" SDK function management Candidates: Twilio, Kandy, Cisco Tropo |
| SD WAN Cloud Connect and Cloud Exchange | MOVE Gateway back to back with SD WAN edge function | MOVE Gateway fronting enterprise private and public cloud apps MOVE Gateway fronting SaaS or PaaS platform | SD WAN Cloud Connect and Cloud Exchange Requires coherent orchestration and management across both the SD WAN and MOVE One SD WAN to MOVE (CE or PE) interconnect provides all MOVE Cloud Connects (including QoS fronthaul + backhaul option from PE to Cloud) |
| SD WAN Exchange | SD WAN1←→MOVE←→SD WAN2 | | Each SD WAN maintains autonomous management, including policy at the SD WAN exchange edge. MOVE Exchange edge policy is "standardized" and published to all. |

69 In still further embodiments of the present invention, extended managed services with monitoring and management can be coherently integrated in the same multi-tier multi-tenant platforms that monitor and manage the MOVE network and the VINE. These may be peer services to the MOVE network and the VINE, or have the MOVE network and the VINE integrated within them.

| Integrated Managed Service | Description | Candidate technology providers |
|---|---|---|
| Mobile Device Protection | Assured and Trusted MOVE edge devices MOVE and VINE only assure data-in-motion | Zimperium ZiAP SDK integrated with MOVE SDK ZiPS full device |

| Integrated Managed Service | Description | Candidate technology providers |
|---|---|---|
| | Enterprise Compliance on the edge requires | protection |
| | Secured app and data-on- device (app developer responsibility) | |
| | secured device | |
| | secured data-in-motion | |
| Cloud Server Protection | Assured and Trusted Cloud Servers under and behind the Cloud MOVE Gateway | Cloud Passage Amazon cloud assurance frameworks |
| | MOVE and VINE only assure data-in-motion | Etc |
| | Enterprise Compliance on the cloud-based server(s) requires | |
| | Secured app and data-on-device (app developer responsibility) | |
| | secured servers and other cloud infrastructure | |
| | secured data-in-motion | |
| SIP Trunking Multimodal collaboration services | Multimodal sessions over MOVE/ VINE Video, voice, messaging, and shared desktop services over MOVE/VINE | TCL TCL and others |
| UC PaaS | Unified Communications Platform-as-a-Service over MOVE/VINE | Kandy, Twilio, others |
| Distributed Cloud Storage | Secure data store behind MOVE/VINE | Dispersive Technologies Storage |
| CASB | Cloud Access Security Management with and behind MOVE/VINE | Palerra, Skyhigh, Netskope, vArmour, etc |

Figure 3:
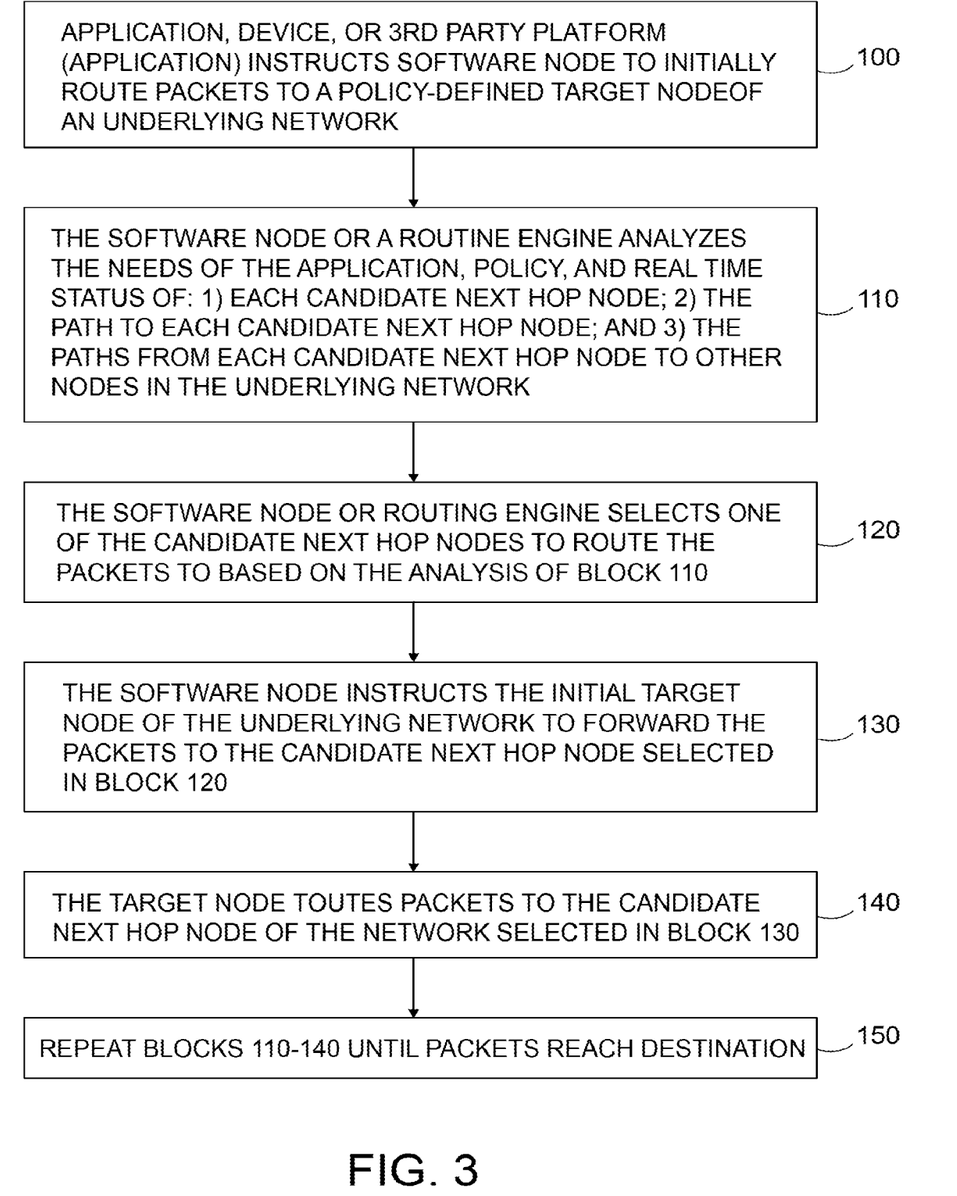
FIG. 3 is a flowchart illustrating the steps of a platform routing and session control method, according to an embodiment of the present invention.

The three part combination of Mobile Device Protection, MOVE/VINE data in motion protection, and Cloud Server protection provides a highly secure end-2-end platform for B2E, B2C IoT, and other business applications. 71 FIG. 3 is a flowchart illustrating the steps of a platform routing and session control method, according to an embodiment of the present invention. In block 100, the application, device or third party platform (hereinafter "application") instructs one of the software nodes of the global overlay network of the present invention (e.g., a MOVE or a VINE endpoint) to initially route packets to a policy-defined target node of an underlying access network (by DNS name, IP address, or policy match). The underlying network comprises wire, and lower layer switches and routers, which transport the packets to the destination. The target node of the underlying network is selected according to the needs of the application and one or more various identities including, but not limited to user identities, application identities, thing (IoT) identities, and silicon/chip/hardware identities. The packets can be an entire application stream, parts of the stream, or packet by packet routing. At the target node, in block 110, an analysis is performed, which may consider one or more of the needs of the application (the policies, business needs and the like describe above) and the real time status of: 1) each candidate next hop node of the underlying network; 2) the path to each candidate next hop node of the underlying network; and 3) the paths from each candidate next hop node of the underlying network to other nodes in that network. This analysis may be made locally with another software node of the global overlay network (e.g., a MOVE or a VINE endpoint) associated with the initial target node, or alternatively, the software node may query a routing engine to perform the analysis to determine the next hop node. The software node and/or the routing engine contains one or more optimization algorithms to perform the analysis. In some embodiments, the software node and/or routing engine can also use machine learning to continuously make changes to preferred routes, networks to be traversed, preferred next hop, or any other of the parameters discussed above. In block 120, one of the candidate next hop nodes of the underlying network is selected by the software node, which best meets the needs of the application based on the analysis performed in block 110 or the routing engine selects one of the candidate next hop nodes of the underlying network, which best meets the needs of the application based on the analysis performed in block 110 in response to the query of the software node and communicates the selection to the software node. In block 130, the software node instructs the initial target node of the underlying network to forward the packets to the candidate next hop node selected in block 120. In block 140, the initial target node forwards the packets to the selected candidate next hop node. In block 150, the blocks 110-140 are repeated along the path until the "packets" reach their destination.

In some embodiments, upon receipt of or the determination of the selected next hop node, the software node may forward the packets to another device and provide that device with the address of the selected next hop node (the new target node). In other embodiments, the software node managing and controlling the target node and any of the software nodes along the path may pass instructions to the application, directly or indirectly, including potentially providing the application with a replacement target node (a new DNS name or IP address to replace this target). The instructions may instruct the application to change its behavior for reasons, such as security, compliance or quality, or prompt the user for a decision. The software nodes of the network may also function as gateways, or insert gateways into the path, for example to do signaling or media interworking, or to encrypt/decrypt streams. The platform of the present invention has the capability to instantly and programmatically (no human involvement) deploy new software nodes (during the current application session) if necessary to meet the current or anticipated (according to machine learning or other algorithms) needs of the application or service. Each of the software network nodes of the global overlay network is acting according to instructions, identities, policies and feedback from the application, and the application managers, such that the application needs are determining the selected nodes of the underlying network, and the transport links between them. Whereas today's networks connect nodes according to the network's policies, the present invention connects applications and services according to their identities, policies and needs.

The global overlay network is integrated with the platform and application technology described above. The software nodes of the global overlay network may be connected as traditional networked nodes, and/or as peer-to-peer mesh nodes, and/or combinations of both. Unlike public Internet nodes, they do not all need to have public addresses or use standard Internet protocols and methods. The software nodes of the global overlay network are agnostic to the underlying network technology and network ownership. The software nodes can be located in public cloud, private cloud and Internet backbone environments, and on end user devices as describe earlier (e.g., MOVE and VINE). The software nodes may be applications, VNFs, standalone devices running on commodity compute, purpose built appliances, or services embedded in network infrastructure such as gateways and session border controllers.

Any and all of the above methodologies may be applied differently for different sets of data to be transmitted by the same application. For example, the same application may have different policies and requirements, and thus issue different instructions to the software nodes, for different types of data or for the same data transmitted at different times or to different recipients.

While exemplary drawings and specific embodiments of the present disclosure have been described and illustrated, it is to be understood that that the scope of the invention as set forth in the claims is not to be limited to the particular embodiments discussed. Thus, the embodiments shall be regarded as illustrative rather than restrictive, and it should be understood that variations may be made in those embodiments by persons skilled in the art without departing from the scope of the invention as set forth in the claims that follow and their structural and functional equivalents.

The invention claimed is:

1. A system comprising:
    an application; and
    one or more software nodes under control of the application, wherein the application is configured to perform:
        instructing a software node of the one or more software nodes to route data to a target node of the one or more software nodes;
        in response to a query of the software node of the one or more software nodes to a routing engine, analyzing, using the routing engine, associated paths through the one or more software nodes to the target node, wherein the associated paths comprise at least one path traversing both a mobile enterprise network and a virtual enterprise network;
        selecting, by the routing engine, one or more candidate next hop nodes of the one or more software nodes based on the analyzing the associated paths;
        communicating, by the routing engine, the one or more candidate next hop nodes of the one or more software nodes, as selected, to the software node of the one or more software nodes;
        causing the data to be routed to at least one of the one or more candidate next hop nodes, as selected; and
        repeating the analyzing, the selecting, and the causing until the data reaches a destination.

2. The system of claim 1, wherein:
    the routing engine comprises another software node of the one or more software nodes; and
    the another software node is different from the software node and the target node.

3. The system of claim 1, wherein analyzing, using the routing engine comprises:
    analyzing, using the routing engine, the associated paths and a real time status of at least one node of the one or more software nodes.

4. The system of claim 1, wherein the mobile enterprise network comprises a mobile overlay virtual enterprise (MOVE) network.

5. The system of claim 1, wherein the virtual enterprise network comprises a virtual internet for enterprise (VINE) network.

6. The system of claim 1, wherein software nodes of the one or more software nodes are connected as traditional networked nodes, as peer-to-peer mesh nodes, or as any combination thereof.

7. The system of claim 1, wherein the application comprises at least one of:
    an enterprise application;
    a software as a service (SaaS);
    a platform as a service (PaaS);
    an internet of things (IoT);
    a cognitive computing application;
    an artificial intelligence (AI) application;
    a virtual reality application;
    an augmented reality application;
    a gaming application; or
    an entertainment application.

8. The system of claim 1, wherein the one or more software nodes are located in a public cloud, in a private cloud, in an Internet, or on end user devices.

9. The system of claim 1, wherein:
    the one or more software nodes comprise gateways or session border controllers.

10. The system of claim 1, wherein the associated paths through the one or more software nodes to the target node are set by one or more triggers.

11. A method performed by an application using one or more software nodes under control of the application comprising:
    instructing a software node of the one or more software nodes to route data to a target node of the one or more software nodes;
    in response to a query of the software node of the one or more software nodes to a routing engine, analyzing, using the routing engine, associated paths through the one or more software nodes to the target node, wherein the associated paths comprise at least one path traversing both a mobile enterprise network and a virtual enterprise network;
    selecting, by the routing engine, one or more candidate next hop nodes of the one or more software nodes based on the analyzing the associated paths;
    communicating, by the routing engine, the one or more candidate next hop nodes of the one or more software nodes, as selected, to the software node of the one or more software nodes;
    causing the data to be routed to at least one of the one or more candidate next hop nodes, as selected; and
    repeating the analyzing, the selecting, and the causing until the data reaches a destination.

12. The method of claim 11, wherein:
the routing engine comprises another software node of the one or more software nodes; and
the another software node is different from the software node and the target node.

13. The method of claim 11, wherein analyzing, using the routing engine comprises:
analyzing, using the routing engine, the associated paths and a real time status of at least one node of the one or more software nodes.

14. The method of claim 11, wherein the mobile enterprise network comprises mobile an overlay virtual enterprise (MOVE) network.

15. The method of claim 11, wherein the virtual enterprise network comprises a virtual internet for enterprise (VINE) network.

16. The method of claim 11, wherein software nodes of the one or more software nodes are connected as traditional networked nodes, as peer-to-peer mesh nodes, or as any combination thereof.

17. The method of claim 11, wherein the application comprises at least one of:
an enterprise application;
a software as a service (SaaS);
a platform as a service (PaaS);
an internet of things (IoT);
a cognitive computing application;
an artificial intelligence (AI) application;
a virtual reality application;
an augmented reality application;
a gaming application; or
an entertainment application.

18. The method of claim 11, wherein the one or more software nodes are located in a public cloud, in a private cloud, in an Internet, or on end user devices.

19. The method of claim 11, wherein:
the one or more software nodes comprise gateways or session border controllers.

20. The method of claim 11, wherein the associated paths through the one or more software nodes to the target node are set by one or more triggers.

* * * * *